United States Patent
Satoyama et al.

(10) Patent No.: US 7,640,415 B2
(45) Date of Patent: Dec. 29, 2009

(54) STORAGE SYSTEM HAVING A FIRST COMPUTER, A SECOND COMPUTER CONNECTED TO THE FIRST COMPUTER VIA A NETWORK, AND A STORAGE DEVICE SYSTEM THAT IS ACCESSED BY THE SECOND COMPUTER

(75) Inventors: Ai Satoyama, Sagamihara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 211 days.

(21) Appl. No.: 11/132,176

(22) Filed: May 19, 2005

(65) Prior Publication Data

US 2006/0218368 A1 Sep. 28, 2006

(30) Foreign Application Priority Data

Mar. 25, 2005 (JP) .............................. 2005-087475

(51) Int. Cl.
*G06F 12/00* (2006.01)
*G06F 13/00* (2006.01)
*G06F 13/28* (2006.01)

(52) U.S. Cl. ...................... 711/170; 711/171; 711/172; 711/173; 711/111; 711/112; 711/114; 711/2; 711/156; 711/161; 711/162; 709/203; 709/211; 709/216; 709/219

(58) Field of Classification Search ................ 711/170
See application file for complete search history.

(56) References Cited

U.S. PATENT DOCUMENTS

| | | | |
|---|---|---|---|
| 5,649,152 | A | 7/1997 | Ohran et al. |
| 2003/0159058 | A1* | 8/2003 | Eguchi et al. ............... 713/193 |
| 2004/0044853 | A1* | 3/2004 | Gibble et al. ............... 711/154 |
| 2004/0054866 | A1 | 3/2004 | Blumeneau et al. |
| 2004/0133575 | A1 | 7/2004 | Farmer et al. |
| 2004/0186900 | A1* | 9/2004 | Nakano et al. .............. 709/213 |
| 2005/0066222 | A1 | 3/2005 | Rowan et al. |
| 2005/0114615 | A1* | 5/2005 | Ogasawara et al. ......... 711/162 |
| 2005/0138287 | A1* | 6/2005 | Ogasawara et al. ......... 711/114 |
| 2008/0114933 | A1* | 5/2008 | Ogasawara et al. ......... 711/114 |
| 2008/0216078 | A1* | 9/2008 | Miura et al. ................ 718/102 |

FOREIGN PATENT DOCUMENTS

JP 2003-242039 8/2003

* cited by examiner

*Primary Examiner*—Christian P Chace
*Assistant Examiner*—Prasith Thammavong
(74) *Attorney, Agent, or Firm*—Brundidge & Stanger, P.C.

(57) ABSTRACT

When a computer 10 receives a request from the client computer 30 to access snapshot files, the target device to be used is identified. The computer 10 makes a request to the identified target device TD for attachment of the logical device LDEV that stores the snapshot files for which access is requested. When the computer 10 receives notification that the attachment has ended from the storage device system 20, the identified target device is mounted on the directory in which the snapshot files are stored.

18 Claims, 14 Drawing Sheets

| Directory device information | | |
|---|---|---|
| Directory information | Mount device information | Corresponding LDEV information |
| mnt/ss/home_s1 | Dev1 | LDEV1 |
| mnt/ss/home_s2 | NULL | LDEV2 |
| ⋮ | ⋮ | ⋮ |

| Device mount information | |
|---|---|
| Device information | Directory information |
| Dev1 | mnt/ss/home_s1 |

| Usable device information | |
|---|---|
| Directory information | Device information |
| mnt/home | Dev0 |
| mnt/ss/home_s1<br>mnt/ss/home_s2<br>⋮<br>mnt/ss/home_sN | Dev1 |

| ST1 Device attachment information ||
|---|---|
| Device number | LDEV no. |
| TD0 | LDEV0 |
| TD1 | LDEV1 |
| TD2 | NULL |

| Device attachment information (when using virtual volume) |||
|---|---|---|
| Attachment subject LDEV | Snapshot data ||
| | Primary (P) LDEV | Snapshot ID |
| LDEV0 | LDEV0 | NULL |
| LDEV1 | NULL | NULL |

| Snapshot management information ||||
|---|---|---|---|
| LDEV | Status | Pair attribute | Concerned pair information |
| LDEV0 | Pair | Primary | Address add01 |
| LDEV1 | Pair | Secondary | Address add02 |
| LDEV2 | Simplex | NULL | |
| ⋮ | ⋮ | ⋮ | ⋮ |
| LDEVn | Simplex | NULL | |

| Snapshot detailed management information | | | |
|---|---|---|---|
| Primary(P) LDEV | Secondary (S) information | | |
| | Snapshot ID | LDEV | Acquisition status |
| LDEV0 | 1<br>:<br>:<br>N | LDEV1<br>NULL<br>NULL<br>NULL<br>NULL | Already acquired<br>Not yet acquired<br>Not yet acquired<br>Not yet acquired<br>Not yet acquired |
| LDEVm | | | |

Address add01 →

| Snapshot detailed management information | |
|---|---|
| Secondary (S) LDEV | Primary (P) LDEV |
| LDEV1 | LDEV0 |
| LDEV2 | NULL |

Address add02 →

Fig.20

| Client No. | IP Address | Target Device | | | | | |
|---|---|---|---|---|---|---|---|
| | | 0 | 1 | 2 | 3 | ... | n |
| C1 | xxx.xxx.xxx.xx1 | 0 | 1 | 0 | 0 | ... | 0 |
| C2 | xxx.xxx.xxx.xx2 | 0 | 1 | 0 | 0 | ... | 0 |
| C3 | xxx.xxx.xxx.xx3 | 0 | 0 | 1 | 0 | ... | 0 |
| ⋮ | ⋮ | ⋮ | | | | | |
| Cn | xxx.xxx.xxx.xxn | Null | Null | Null | Null | | n |

STORAGE SYSTEM HAVING A FIRST COMPUTER, A SECOND COMPUTER CONNECTED TO THE FIRST COMPUTER VIA A NETWORK, AND A STORAGE DEVICE SYSTEM THAT IS ACCESSED BY THE SECOND COMPUTER

This application claims the benefit of priority of Japanese Patent Application No. 2005-87475 filed on Mar. 25, 2005, the disclosure of which is also entirely incorporated herein by reference.

BACKGROUND

The present invention relates to a storage system comprising a storage device system comprising a computer and a plurality of logical storage areas.

Generally, for a storage system, a computer (file system) is able to access desired files (storage areas) in a storage device system via a target device. The target device is a logical device on a storage device system recognizable as subject to access from the computer, and is provided virtually using software, or physically using hardware. The target devices are uniformly correlated to the storage areas, and the computer is able to access the desired storage area by identifying a target device using a port ID (e.g. an identifier for uniformly identifying a port called a WWN (World Wide Name)) and an LUN (Logical Unit Number).

However, when there is a limit to the number of target devices that may be provided by the storage device system, the data capacity that may be stored in the storage device system is limited by the target device count. Also, even when there is a not a de facto limit in the number of target devices that may be provided by the storage device system, the number of target devices increases together with an increase in the file count, and there is the problem that the target device resources for the storage device system are consumed.

These problems become severe when executing a point in time copy for which it is possible to reproduce the storage state of the storage device system at an identified point in time, a so-called snapshot. Specifically, the storage device system is a system for storing data sent successively from the client computer, and when the target device resources decrease due to an increase in the number of snapshot files, the number of target devices to be allocated to the new storage areas for storing data written from the client computer also decreases. Also, when there is a limit to the number of target devices, even when there are sufficient empty areas for storing the data in the storage device system, the storage device system may not store the information originally to be stored, and there is the risk of hindrance to the function to be provided by the storage device system for storing the snapshot files.

SUMMARY

The present invention is created in order to address at east part of the problems noted above, and its purpose is to provide effective use of the target device resources for the storage device system of the storage system.

The first aspect of the present invention for addressing the problems noted above provides a storage system having a computer and a storage device system, wherein the storage device system is accessed by the computer and has a plurality of logical storage areas. In the storage system of the first aspect of the present invention, the computer comprises a receiving unit that receives requests to access one storage area of computer among a plurality of storage area of computers, wherein the storage area of computers are recognized by the computer and corresponding to the plurality of logical storage areas, target device identification module that identifies a target device to be mounted in the storage area of computer for which access is requested from among the plurality of target devices, wherein the plurality of target devices are recognized by the computer as subjects for access in the storage device system, mounting module that mounts the identified target device on the storage area of computer for which the access is requested, and a transmission unit that transmits to the storage device system an access request to the storage area corresponding to the storage area of computer for which the access is requested, and the storage device system comprises one or a plurality of physical storage devices forming the plurality of logical storage areas, the plurality of target devices for which one logical storage area of the plurality of logical storage areas is allocated, a receiving unit that receives the access request transmitted from the computer, and an allocation change module that allocates the logical storage area for which the access is requested to the identified target device according to the access request.

According to the storage system of the first aspect of the present invention, the computer identifies the target device to be mounted in the requested storage area of computer from among the plurality of target devices recognized as subject to access for the storage device system, and transmits to the storage device the access request that is the request for access via the identified target device, and the storage device system allocates the storage area corresponding to the storage area of computer for which the access is requested in relation to the identified target device according to the access request transmitted from the computer, so it is possible to try to achieve effective use of the target device resources for the storage device system of the storage system.

The second aspect of the present invention provides a storage system comprising a computer and a storage device system having a physical storage area for storing the primary information and a logical storage area for storing information for providing the primary information at any time. In the storage system of the second aspect of the invention, the computer comprises a receiving unit that receives access requests to the primary information at the any time, target device identification module that identifies the target device to be mounted in the storage area of computer from among a plurality of target devices recognized by the computer as subject to access, wherein the storage area of computer is corresponding to the storage area for storing the information for providing the primary information at the requested any time, and a transmission unit that transmits to the storage device system the access request to the storage area that stores information for providing the primary information at the requested any time, and the storage device system comprises one or a plurality of physical storage devices for forming the plurality of logical storage areas, the plurality of target devices for which one logical storage area of the plurality of the logical storage areas is allocated, a receiving unit that receives the access request transmitted from the computer, and allocation change module that allocates the storage area for storing information for providing the primary information at any time when the access is requested to the identified target device according to the access request.

According to the storage system of the second aspect of the present invention, the computer identifies the target device to be mounted in the storage area of computer for storing the information for providing the primary information at the requested any time from among the plurality of target devices recognized as subject to access, and transmits to the storage device the access request that is the request for access to the storage area for storing the information for providing the primary information at the requested any time via the identified target device, and the storage device system allocates the storage area for storing the information for providing the primary information at any time for which access to the identified target devices is requested according to the access request transmitted from the computer, so it is possible to attempt to achieve effective use of the target device resources for the storage device system of the storage system.

The third aspect of the present invention provides a computer for accessing a storage device system comprising one or a plurality of storage devices for forming a plurality of logical storage areas. The computer of this third aspect of the present invention comprises storage area of computer provision module that provides the plurality of storage area of computer identified by the computer respectively to the plurality of storage areas, a receiving unit that receives access requests to one storage area of computer from among the plurality of storage area of computer, target device identification module that identifies the target device to be mounted on the requested storage area of computer from among the plurality of target devices recognized by the computer as subject to access for the storage device system, mount decision module that determines whether the target device to be correlated to the requested storage area of computer is mounted on another storage area of computer, unmounting module that unmounts the target device when the target device to be correlated to the requested storage area of computer is mounted on the other storage area of computer, mounting module that mounts the target device to the requested storage area of computer after receiving allocation completion notification from the storage device system, and a transmission unit that transmits to the storage device the access request via the identified target device to the storage area corresponding to the requested storage area of computer.

According to the computer of the third aspect of the present invention, the target device to be mounted in the requested storage area of computer is identified from among the plurality of target devices, a determination is made of whether or not the target device corresponding to the requested storage area of computer is mounted in another storage area of computer, and when the target device corresponding to the requested storage area of computer is mounted in another storage area of computer, the target device is unmounted, and after receiving the allocation completion notification from the storage device system, the target device is mounted in the requested storage area of computer, and the access request in relation to the storage area of the storage device system corresponding to the requested storage area of computer is transmitted to the storage device via the identified target device, so it is possible to attempt to achieve effective use of the target device resources for the storage device system of the storage system.

In addition to the storage system and the computer, the present invention additionally achieves realization of a storage system control method, a computer control method, a storage system control program, a computer control program, and a computer readable recording medium on which these control programs are recorded. Other aspects and advantages of the present invention will become apparent from the following detailed description, taken in conjunction with the accompanying drawings, illustrating by way of example the principles of the present invention.

BRIEF DESCRIPTION OF THE DRAWINGS

The present invention will be readily understood by the following detailed description in conjunction with the accompanying drawings. To facilitate this description, like reference numerals designate like structural elements.

FIG. 4 is an explanatory drawing showing an example of the table for storing the directory device information.

FIG. 5 is an explanatory drawing showing an example of the table for storing the device mount information.

FIG. 6 is an explanatory drawing showing an example of the table for storing the device mount information.

FIG. 9 is an explanatory drawing showing an example of the table for storing the device attachment information when using the virtual volume.

FIG. 10 is an explanatory drawing showing an example of the table for storing the snapshot management information.

FIG. 11 is an explanatory drawing showing an example of the table for storing the snapshot detailed management information.

FIG. 12 is an explanatory drawing showing an example of the table for storing the snapshot detailed management information.

FIG. 20 is an explanatory drawing showing an example of the client identification table comprised by the computer.

DETAILED DESCRIPTION OF PREFERRED EMBODIMENTS

Following, the storage system of the present invention is described based on several embodiments while referencing the drawings.

First Embodiment

Figure 1:
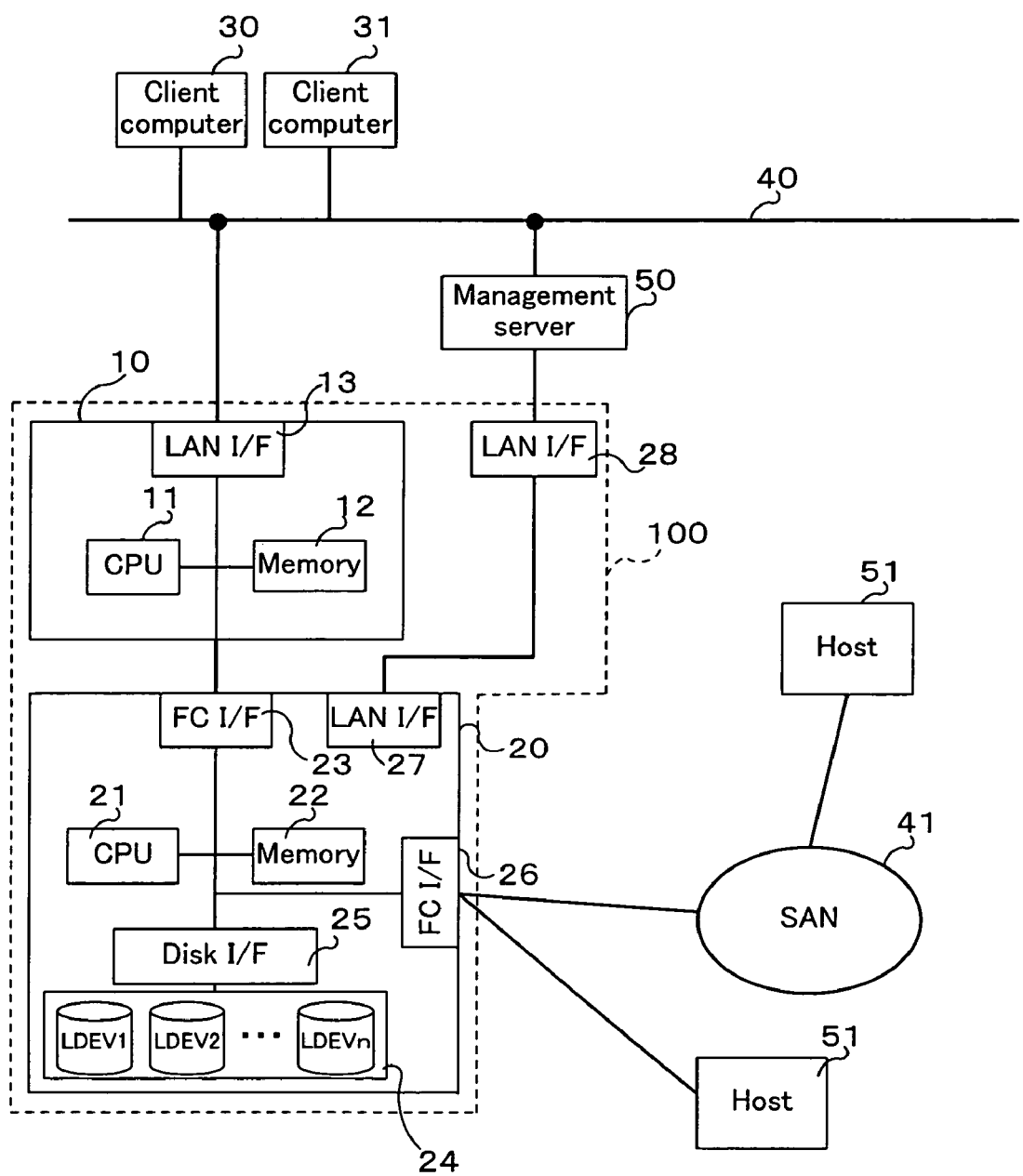
FIG. 1 is an explanatory drawing showing the schematic structure of the storage system of the first embodiment.

System Configuration:

The schematic structure of the storage system of the first embodiment is described while referencing FIG. 1. FIG. 1 is an explanatory drawing showing the schematic structure of the storage system of the first embodiment.

The storage system 100 of the first embodiment comprises a computer 10 and a storage device system 20 accessed by the computer 10. A client computer 30 and 31, a management server 50, and a service host 51 are connected via a network 40 or are directly connected to the storage system 100. With the storage system 100 of the first embodiment, the computer 10 and the storage device system 20 are stored in the same case, and this is identified as a file server from external computers. Also, because the computer 10 and the storage device system 20 are stored in the same case, writing and reading of files and generation of files are executed using common control commands between the computer 10 and the storage device system 20.

The computer 10 of the first embodiment is connected to the client computers 30 and 31 via the network 40. The network 40 is a local area network (LAN) built using the Ethernet (registered trademark), and data transmission is executed using the TCP/IP protocol as the communication protocol. The client computers 30 and 31 are external computers that use the storage system 100, and request file write, read, and generation to the storage device system 20 via the computer 10 within the storage system 100.

The computer 10 internally comprises a central processing unit (CPU) 11, memory 12, and a LAN interface 13. The CPU 11, the memory 12, and the LAN interface 13 are mutually connected via a bus. The CPU 11 is the operation processing device for executing various types of programs and modules stored in the memory 12. The memory 12 is a so-called internal storage device, and comprises both non-volatile memory for storing various modules and the like and volatile memory for temporarily storing the operation processing results. The LAN interface 13 is connected to the network 40, and executes sending and receiving of commands and data between the client computers 30 and 31 using the TCP/IP protocol.

The storage device system 20 comprises the central processing unit (CPU) 21, the memory 22, the FC interface 23 and 26, a plurality of disk devices 24, a disk interface 25, and a LAN interface 27. The CPU 21 executes various control processes for the storage device system 20 by executing various programs and modules stored in the memory 22. The memory 22 is a so-called internal storage device, and comprises both non-volatile memory for storing various modules and the like and volatile memory for temporarily storing the operation processing results.

The FC interface 23 is connected using optical fiber cable or copper wire, for example, and executes sending and receiving of commands and data between the computer 10 and the storage device system 20 using the fiber channel protocol.

The disk device 24 is a disk array device made by RAID construction from a plurality of magnetic hard disk drives, and provides one or a plurality of storage areas, specifically, logical devices (LDEV) using the plurality of hard disk drives, or provides one or a plurality of logical devices by one hard disk drive. Access to each of the logical devices (also called logical units) is executed using the logical unit number (LUN) and the logical block address (LBA).

The CPU 21 is connected to the disk device 24 via the disk interface 25. The disk interface 25 converts the logical addresses transmitted from the CPU 21 to the logical block addresses, and access to each of the logical devices is realized by the CPU 21.

A service host computer 51 is connected to the FC interface 26 via the optical fiber cable, or the service host computer 51 is connected via an SAN (Storage Area Network). The service host computer 51 executes work programs such as a database management system (DBMS), writes the processing results to the storage device system 20, or uses the information resources stored in the storage device system 20. With SAN, fiber channel and iSCSI communication protocol are used.

The client computers 30 and 31 are terminal devices for inputting or outputting various types of data to the storage device system 20, for example, and may also comprise one unit or three or more units.

The management server 50 is a management computer for executing management on the storage system 100, for example, creation of volumes on the storage device system 20, allocation to the host, zoning, and setting of LUN masking. The management server 50 is connected to the LAN interface 27 of the storage device system 20 via the LAN interface 28 of the storage system 100, and executes sending and receiving of commands and data between the storage device system 20 using the TCP/IP protocol.

Figures 2, 3:
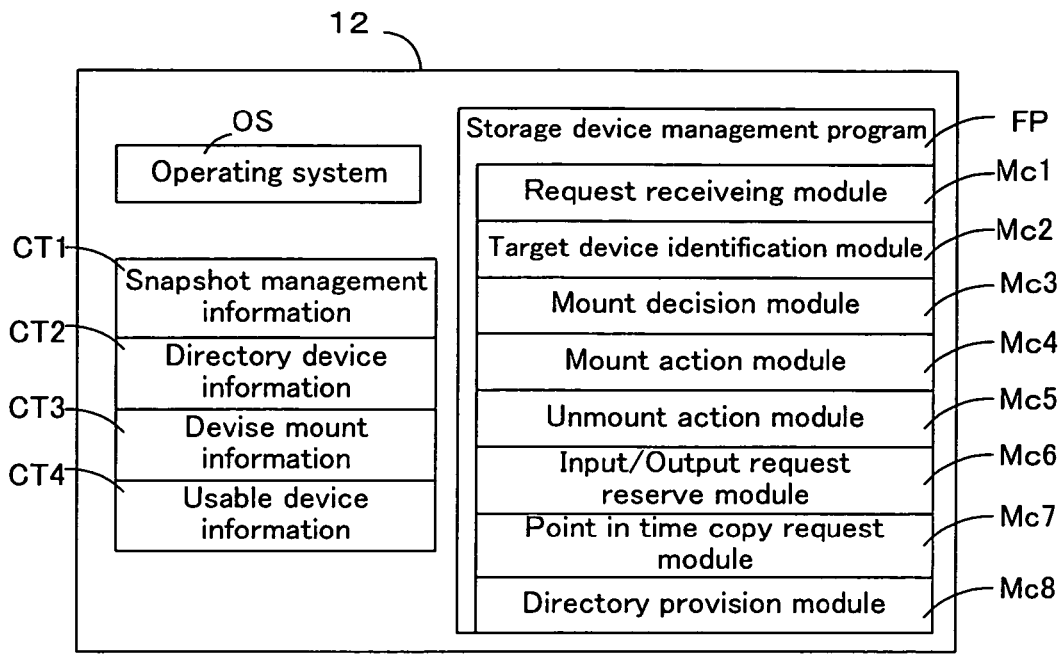
FIG. 2 is an explanatory drawing conceptually showing the various programs and modules stored in the memory of the computer included in the storage system of the first embodiment.
FIG. 3 is an explanatory drawing showing an example of the table for storing the snapshot management information.

The various programs and modules stored in the memory 12 of the computer 10 will be described while referencing FIG. 2 to FIG. 6. FIG. 2 is an explanatory drawing conceptually showing the various programs and modules stored in the memory 12 of the computer 10 contained in the storage system of the first embodiment of FIG. 2. FIG. 3 is an explanatory drawing showing an example of the table for storing the snapshot management information. FIG. 4 is an explanatory drawing showing an example of the table for storing the directory device information. FIG. 5 is an explanatory drawing showing an example of the table for storing the device mount information. FIG. 6 is an explanatory drawing showing an example of the table for storing the device mount information.

With this embodiment, following, an example is described of storing snapshot files for the storage system 10 in the logical device. Stored in the memory 12 are the operating system OS for realizing the backbone processes of the computer 10, the storage device system management process program FP for operating on the operating system OS, the snapshot management information table CT1, the device mount information table CT2, the directory device information table CT3, and the usable device information table CT4.

The storage device system management program FP is a program for managing access to the storage device system 20, and contains several execution modules. The request receiving module Mc1 receives requests for access to the computer side logical device (directory) identified by the computer 10 from the client computers 30 and 31. When the request receiving module Mc1 receives a request to access an identified computer side logical device, the target device identification module Mc2 identifies the target device to be mounted in the computer side logical devices for which access is requested. Here, the target device is the logical device that may be recognized as the device subject to access when the computer 10 accesses the storage device system 20, and is defined by the port ID and the LUN. Specifically, the computer 10 is able to access the desired logical device corresponding to the computer side logical device via the target device that has the port role for the storage device system 20. Generally, the target device and the computer side logical device have a uniform relationship and the path is fixed, but with this embodiment, one or a plurality of computer side logical devices are dynamically allocated to one target device, so the path for the logical device changes. Note that the target device may also be the plurality of physical ports comprised in the storage device system 20, or may also be the virtual port provided logically by the port provision module comprised by the storage device system 20.

The mount decision module Mc3 determines whether the target device identified by the target device identification module Mc2 is already mounted in another computer side logical device. Specifically, as described previously, with this embodiment, a plurality of computer side logical devices may be allocated to the target device, so this determination is necessary. The mounting module Mc4 mounts the identified target device to the computer side requested logical device for which access is requested. As a result, the computer 10 is capable of accessing the logical device of the storage device system 20 corresponding to the computer side requested logical device via the target device. Note that with this embodiment, to prevent erroneous access to another logical device, after receiving notification to the effect that attachment is completed for the requested logical device to the identified target device from the storage device system 20 side, the mount action module Mc4 mounts the identified target device to the computer side requested logical device.

The unmount action module Mc5 cancels the mounting of the target device to the computer side logical device. As a result, the computer 10 is not able to access the logical device of the storage device system 20 corresponding to the computer side requested logical device via the target device. Note that the actual entity comprising the target device and the logical device is the storage device system 20, and at the computer 10, the process of mounting and unmounting the computer side target device on the computer side logical device (directory) realized by software is executed on the operating system (file system). At the storage device system 20 side, as described previously, attachment (allocation) or detachment (allocation release) of the target device and the logical device is executed corresponding to the mounting and unmounting of the identified target device for the computer side requested logical device for the computer 10. With the description that follows, the target device (target device information) recognized on the operation system of the computer 10 is the target device Dev, and the actual target device for the storage device system 20 is the target device TD. Also, the computer side storage area (storage area of computer) is called the directory, and the storage area of the storage device system 20 is called the logical device LDEV. Furthermore, the logical device LDEV is also called the logical unit LU.

The Input/Output request reserve module Mc6 transmits to the storage device system 20 the command for requesting access to the logical device of the storage device system 20 corresponding to the computer side requested logical device. The commands contain information for identifying the logical device to be attached to the target device.

The point in time copy request module Mc7 is the module for requesting a point in time copy, acquisition of so-called snapshot files, to the storage device system 20. The snapshot is technology for copying an identified volume (directory) at an identified point in time, or of acquiring the difference data in relation to the original volume and reproducing the volume for the identified point in time. Generally, the former is the mirroring type snapshot executed by copying an identified volume at an identified point in time to another volume, and the latter is the copy on write type snapshot executed by saving the information prior to changing for the changed part in relation to the original volume to another volume. In either case, it is possible to call an identified volume at an identified point in time (generation) from the client computers 30 and 31.

The directory provision module Mc8 provides the computer side storage area (directory) corresponding to the storage areas (logical device) comprised by the storage device system 20. Specifically, identification and operation of the logical devices existing on the storage device system 20 side are made possible on the computer 10 side via the directory. This module function is provided using the file system for example.

The snapshot management information table CT1 is described while referencing FIG. 3. The snapshot system comprises a pair consisting of a primary volume (main volume) of which a snapshot is taken and a volume for storing the snapshot (secondary volume). Therefore, the snapshot management information table CT1 contains the snapshot primary side information and the secondary information. The primary information has the primary directory information stored in it, and the secondary information contains the ID that indicates the snapshot generation, the stored directory information, and information indicating whether or not the snapshot is acquired, specifically, information indicating whether or not the snapshot file is stored. The example in FIG. 3 comprises a pair consisting of the primary directory (/mnt/home) and each secondary directory (/mnt/ss/home_sN), and the snapshot files are stored in the secondary directories of ID=1 to 3.

The directory device information table CT2 will be described while referencing FIG. 4. The directory device information table CT2 contains the information on the directory to mounting the target device Dev, the information for the target device Dev on which the directory is mounted, and the information of the logical device LDEV corresponding to the directory. Note that as will be described later, when using the copy on write type snapshot used by the virtual volume, the same logical device LDEV is allocated to the plurality of secondary directories. In this case, it is possible to determine whether or not the logical device LDEV is mounted by whether or not the mount device information is NULL (unmounted or not mounted). With the example in FIG. 4, the target device Dev1 is mounted in the secondary directory (/mnt/ss/home_s1), and the logical device LDEV corresponding to the secondary directory (/mnt/ss/home_s1) is the LDEV1. Also, the target device Dev is not mounted on the secondary directory (/mnt/ss/home_s2), and the logical device corresponding to the secondary directory (/mnt/ss/home_s2) is the LDEV2.

The device mount information table CT3 will be described while referencing FIG. 5. The device mount information table CT3 shows the directory that is currently mounted in the target device Dev. With the example in FIG. 5, the secondary directory (/mnt/ss/home_s1) is mounted in the target device Dev.

The usable device information table CT4 will be described while referencing FIG. 6. The usable device information table CT4 is the table indicating the usable target devices Dev. With the example in FIG. 6, the primary directory (/mnt/home) is mounted in the target device Dev0, and the secondary directory (/mnt/ss/home+s1) is mounted in the target device Dev1.

Figures 7, 8:
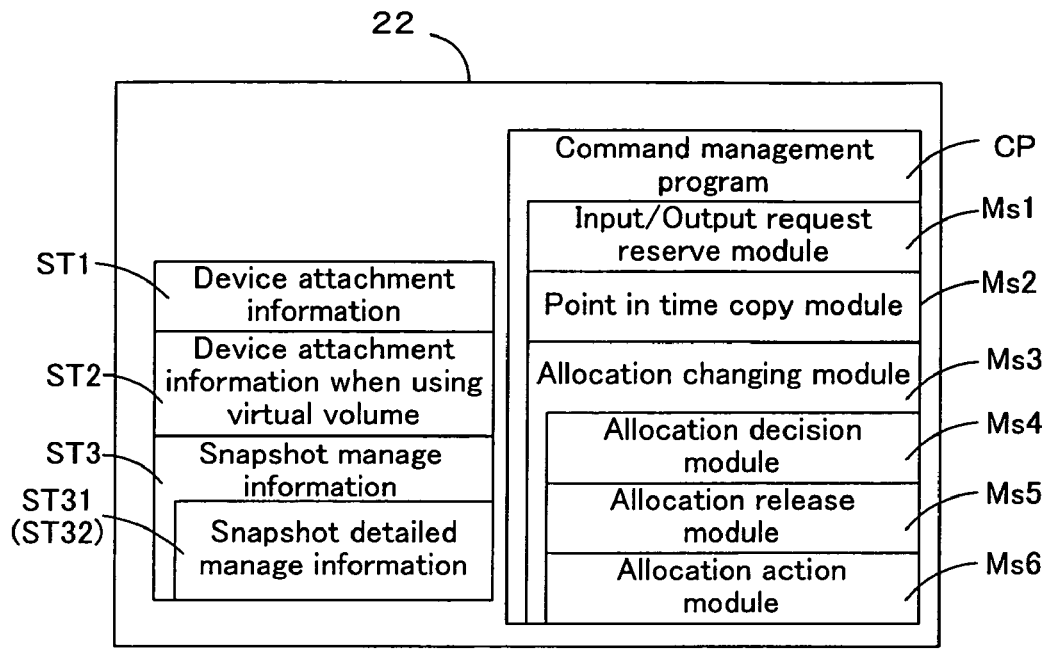
FIG. 7 is an explanatory drawing conceptually showing the various programs and modules stored in the memory of the storage device system included in the storage system of the first embodiment.
FIG. 8 is an explanatory drawing showing an example of the table for storing the device attachment information.

The various types of programs and modules stored in the memory 22 of the storage device system 20 will be described while referencing FIG. 7 to FIG. 12. FIG. 7 is an explanatory drawing that conceptually shows the various types of programs and modules stored in the memory 22 of the storage device system 20 contained in the storage system of the first embodiment. FIG. 8 is an explanatory drawing showing an example of the table for storing the device attachment information. FIG. 9 is an explanatory drawing showing an example of the table for storing the device attachment information when the virtual volume is used. FIG. 10 is an explanatory drawing showing an example of the table for storing the snapshot management information. FIG. 11 is an explanatory drawing showing an example of the table for storing the snapshot detailed management information. FIG. 12 is an explanatory drawing showing an example of the table for storing the snapshot detailed management information.

The memory 22 stores the command processing program CP for interpreting commands received from the computer 10 and executing the requested processes, the device attachment information table ST1, the device attachment information table ST2 when using the virtual volume, the snapshot management information ST3, and the snapshot detailed management information ST31 and ST32.

The command management program CP is a program for acquiring snapshots for the storage device system 20, and for realizing the execution of access (read/write) to the requested logical device (snapshot file), and the command management program CP contains several execution modules. The Input/Output request reserve module Ms1 receives access requests from the computer 10. When the Input/Output request reserve module Ms1 receives the access request, the allocation change module Ms3 allocates the logical device LDEV for which access is requested to the identified target device TD. To suitably allocate the logical device LDEV to the identified target device TD, the allocation change module Ms3 comprises three more modules, the allocation decision module Ms4, the allocation release module Ms5, and the allocation action module Ms6.

The allocation decision module Ms4 determines whether the identified target device TD for which there has been a request for allocation of the logical device LDEV has already had another logical device LDEV allocated (attached). Specifically, as described above, in this embodiment, since a plurality of logical devices LDEV may be allocated to the target device TD, this determination is necessary.

The allocation release module Ms5 cancels the allocation of the logical device LDEV to the identified target device TD. As a result, it is possible to allocate the logical device LDEV for which access is requested to the identified target device TD. The allocation action module Ms6 allocates the requested logical device LDEV for which access has been requested to the identified target device TD. The allocation and allocation release of the logical device LDEV to the target device TD is realized by the switching of the path to the logical device LDEV.

The point in time copy module Ms2 is module for executing the acquisition of the so-called snapshot files for the storage device system 20. For the acquisition of snapshots, creation of the secondary volumes for the primary volumes, copying of the primary volume data to the secondary volume or saving of the data subject to updating for the primary volume to the secondary volume, and updating of the snapshot management information are executed.

The device attachment information table ST1 will be described while referencing FIG. 8. Described in the device attachment information table ST1 is the logical device LDEV allocated (attached) to the target device TD. With the example in FIG. 8, the logical device LDEV0 is attached to the target device TD0, the logical device LDEV1 is attached to the target device TD1, and the logical device LDEV is not attached to the target device TD2.

The device attachment information table ST2 when using the virtual volume is described while referencing FIG. 9. The virtual volume is used when using the copy on write type snapshot. Specifically, with the copy on write type snapshot, the data before updating (difference data) of the data that is subject to updating (correction) for the primary volume is stored together with the information at the time of update in a storage pool formed by a plurality of logical devices. When access is requested to a snapshot file at an identified point in time, the computer 10 forms the virtual volume using a group of difference data from the identified time and thereafter, and attaches this to the corresponding logical device LDEV. The computer 10 uses the data stored in the current primary volume and the difference data group to create a snapshot file of the identified point in time.

When using the virtual volume, the device attachment information table ST2 stores the logical device for attaching the virtual volume (snapshot file), the information of the logical device LDEV for which the snapshot file primary volume is attached, and the snapshot ID. With the example in FIG. 9, the snapshot is not acquired, and when the snapshot is acquired later and the logical device LDEV1 is shared by the snapshot ID 1 to 3, one of the values 1 to 3 is stored in the space for the LDEV1 snapshot ID.

The snapshot management information table ST3 will be described while referencing FIG. 10. Contained in the snapshot management information table ST3 comprised by the storage device system 20 are the status indicating whether or not each of the logical devices LDEV is in a pair state with any of the other logical devices LDEV, the pair attribute indicating whether the logical device LDEV in the pair state is the primary or the secondary logical device, and the address of pair information for storing the pointer indicating the information of the pair logical device LDEV that is the subject. With the example in FIG. 10, the logical devices LDEV0 and LDEV1 are in a paired state, with the logical device LDEV0 being the copy source primary logical device, and the logical device LDEV1 being the copy destination (snapshot file storage destination) secondary logical device. There is no snapshot file stored in the logical device LDEV2, the status is simplex (state without creating a pair), and the pair attribute is NULL.

Referencing FIG. 11 and FIG. 12, the primary snapshot detailed management information table ST31 and the secondary snapshot detailed management information table ST4 which are indicated by the pointer contained in the subject pair information of the snapshot management information table ST3 will be described. Included in the primary snapshot detailed management information table ST31 are the snapshot ID of the secondary logical device in a paired relationship with the primary logical device, the logical device number, and the acquisition status indicating whether or not the snapshot has already been acquired. With the example in FIG. 11, the logical device LDEV1 for which the snapshot ID=0 is registered as the pair logical device LDEV. Included in the secondary snapshot detailed management information table ST32 is information of the primary logical device that is in a paired relationship with the secondary logical device. With the example in FIG. 12, the primary logical device LDEV0 is registered in the secondary logical device LDEV1 as the pair logical device LDEV.

Note that when using the virtual volume, the snapshot management information table ST3 logical device number, the primary snapshot management information table ST31 primary logical device number, and the secondary logical device number, as well as the secondary snapshot management information table ST32 primary logical device number and the secondary logical device number each indicate the virtual volume number.

Figure 13:
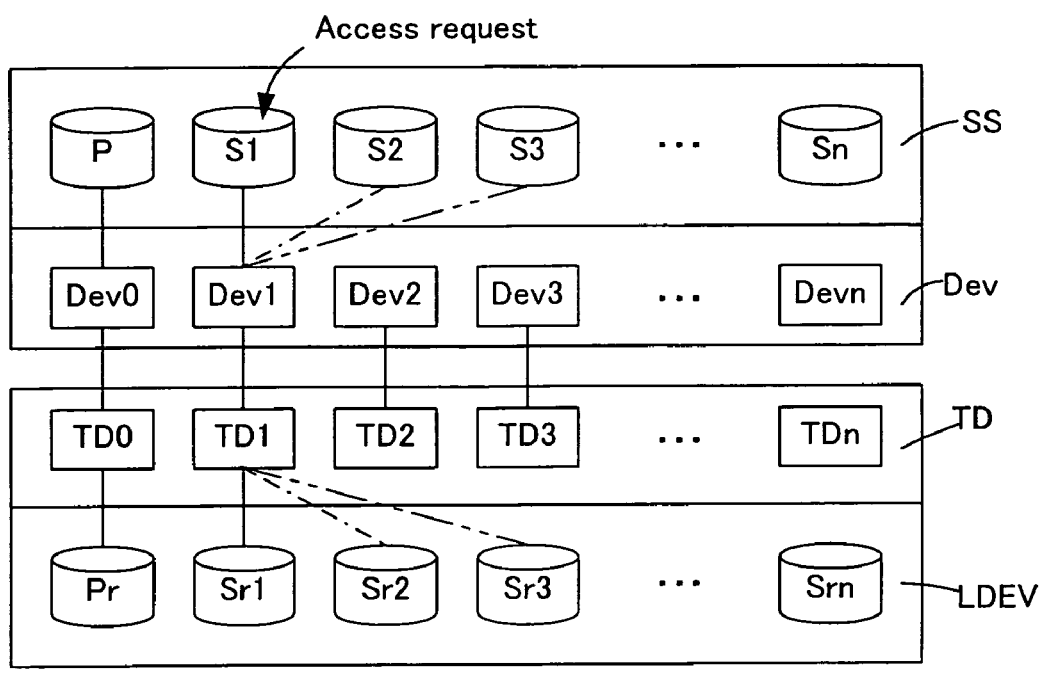
FIG. 13 is an explanatory drawing typically showing the correlation of the snapshot file information and the target device information recognized by the file system of the computer, and the target device and the logical device for the storage device system.
Figure 14:
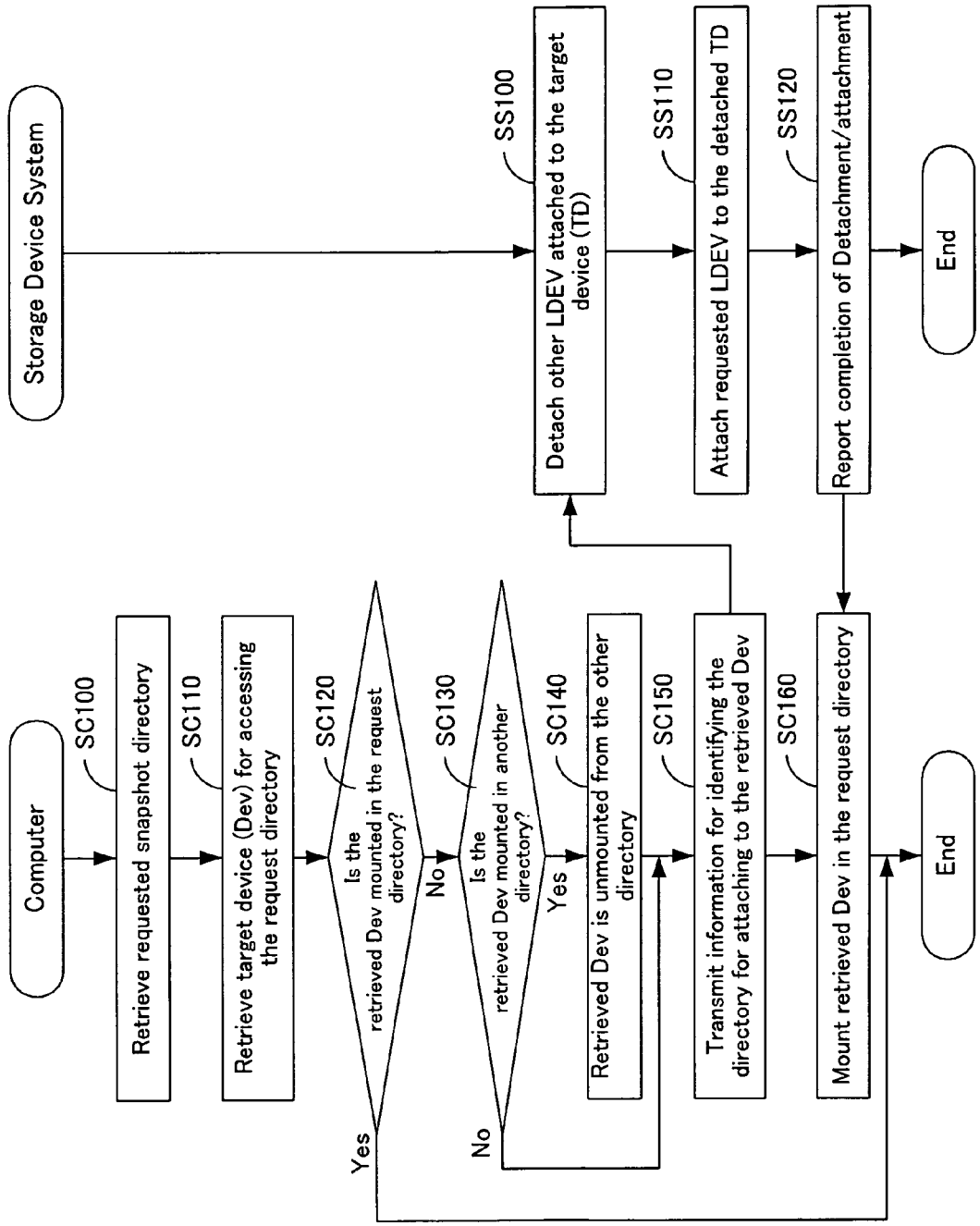
FIG. 14 is a flow chart showing the processing routine executed for the routine of accessing the mirroring type snapshot files.

The access process that is executed when accessing the mirroring type snapshot file will be described while referencing FIG. 13 and FIG. 14. FIG. 13 is an explanatory drawing showing the typical correlation between the snapshot file information SS and the target device information Dev recognized by the file system of the computer 10 and the target device TD and the logical device LDEV (snapshot file actual information) for the storage device system 20. FIG. 14 is a flow chart showing the processing routine executed for the process of accessing the mirroring type snapshot file.

With FIG. 13, the primary volume file recognized by the client computer 30 (31) is represented as file P, and the snapshot files are represented as snapshot files S to Sn, and the actual primary volume file is represented as the file Pr and the actual snapshot file is represented as the snapshot file Sr1 to Srn. The primary volume file P and the snapshot files S1 to Sn are identified by the directory SS, and the actual snapshot files Sr1 to Srn are identified by the logical device LDEV. With the example in FIG. 13, the target device Dev0 is mounted on the primary volume file P. The snapshot files S1 to S3 which are the secondary volume files of the primary volume file may be exclusively mounted respectively in the target device Dev1. With FIG. 13, there is an access request to the snapshot file S1, so the directory of the snapshot file S1 is mounted in the target device Dev1. Each of the target devices Dev recognized by the computer 10 is uniquely correlated respectively to the target device TD for the storage device system 20. The storage device system 20 comprises a plurality of target devices TD, and a plurality of logical devices LDEV (actual snapshot files) are attached to one target device TD. For example, the primary volume file Pr is attached to the target device TD0, and the plurality of actual snapshot files Sr1 to Sr3 are exclusively attached to the target device TD1. With the example in FIG. 13, the target device TD1 is attached to the logical device LDEV1 that stored the actual snapshot file Sr1. Specifically, the logical device LDEV is attached to the target device TD for the storage device system 20 so as to correspond to the mounting of the target device Dev to the directory SS for the computer 10.

When there is a request for access to the snapshot file Sn of an identified generation for the primary volume file P from the client computers 30 and 31, the flow chart shown in FIG. 14 is executed. The CPU 11 uses the snapshot management information table CT1 stored in the memory 12 and retrieves the directory SS in which the requested snapshot file Sn is stored (step SC100). In specific terms, the directory SS for which access is requested is retrieved using the snapshot file ID (identifier) sent from the client computers 30 and 31. For example, when a request to access the snapshot for which ID=1 for /mnt/home is received from the client computer 30, then access to the directory (/mnt/ss/home_s1) will be requested.

The CPU 11 uses the usable device information table CT4 to retrieve the target device Dev used for accessing the retrieved directory (step SC110). Specifically, the usable target device Dev is retrieved (identified). With the example of the usable device information table CT4 shown in FIG. 6, the target device Dev1 may be used for the directory (/mnt/ss/home_s1). Following, with a specific example, the request directory will be (/mnt/ss/home_s1), and the retrieved target device Dev will be Dev1.

The CPU 11 uses the directory device information table CT2 and determines whether or not the retrieved target device Dev is mounted in the requested directory (step SC120). In specific terms, with the example shown in FIG. 4, at the directory device information table CT2, a determination is made of whether or not the retrieved target device Dev is mounted in the request directory (step SC120: Yes), and even if the target device Dev is already mounted in the request directory, the requested snapshot file Sr is already attached to the target device TD corresponding to the storage device system 20 as well, so this processing routine ends. Specifically, the client computers 30 and 31 are in a state capable of accessing the snapshot file S1.

When the CPU 11 determines that the retrieved target device Dev is not mounted in the request directory (step SC120: No), a determination is made of whether or not the retrieved target device Dev is mounted in another directory (step SC130). In specific terms, the CPU 11 determines whether or not the mount device information in the request directory for the directory device information table CT2 is NULL, and also whether or not the retrieved target device Dev is registered in the mount device information in another directory. For example, when the request directory is (/mnt/ss/home_s2), and the identified target device is Dev1, with the example in FIG. 4, the target device Dev1 is mounted in the directory (/mnt/ss/home_s1), and the mount device information of the request directory (/mnt/ss/home_s2) is NULL, so the retrieved target device Dev is mounted in another directory.

When the CPU 11 determines that the retrieved target device Dev is mounted in another directory (step SC130: Yes), the retrieved target device information Dev is unmounted from the other directory (step SC140). In specific terms, the CPU 11 invalidates, in other words, nullifies, the mount device information of the other directory (/mnt/ss/home_s1) in which the retrieved target device Dev1 stored in the directory device information CT2 is mounted, and the directory information of the target device Dev1 for the device mount information table CT3.

When the CPU 11 determines that the retrieved target device Dev is not mounted in the other directory (step SC130: No), step SC140 is skipped, and the process moves to step SC150.

At step SC150, the CPU 11 transmits to the storage device system 20 the access request containing the identification information for identifying the logical device LDEV to be attached to the retrieved target device Dev. For the identification information, the information of the logical device corresponding to the retrieved target device Dev retrieved for the directory device information table CT2 is used. In specific terms, information for identifying the logical device LDEV1 is sent.

When the CPU 21 of the storage device system 20 receives an access request from the computer 10, the other logical device LDEV that is attached to the target device TD uniquely corresponding to the retrieved target device Dev is detached (SS100). In specific terms, the CPU 21 nullifies the LDEV that is attached to the retrieved target device TD in the device attachment information table ST1.

The CPU 21 attaches the logical device identified by the identification information received from the computer 10 to the target device TD from which the logical device LDEV is detached (step SS110). In specific terms, the CPU 21 registers the LDEV1 to the LDEV that is attached to the concerned target device TD in the device attachment information table ST1.

The CPU 21 transmits a detachment/attachment completion report to the computer 10 (SS12), and this processing routine ends.

When the CPU 11 of the computer 10 receives the detachment/attachment completion report from the storage device system 20, the requested directory is mounted in the retrieved target device information Dev (step SC160), and this process routine ends. In specific terms, the CPU 11 registers the retrieved target device information Dev to the mount device information of the directory information in the directory device information table CT2, and registers the request directory in the directory information of the retrieved target device information Dev in the device mount information table CT3. For example, when the request directory is (/mnt/ss/home_s1), the retrieved target device information Dev1 is registered in the mount device information of the request directory (/mnt/ss/home_s2) in the directory device information table CT2, and the request directory (/mnt/ss/home_s2) is registered in the directory information of the retrieved target device information Dev in the device directory information table CT3.

Figure 15:
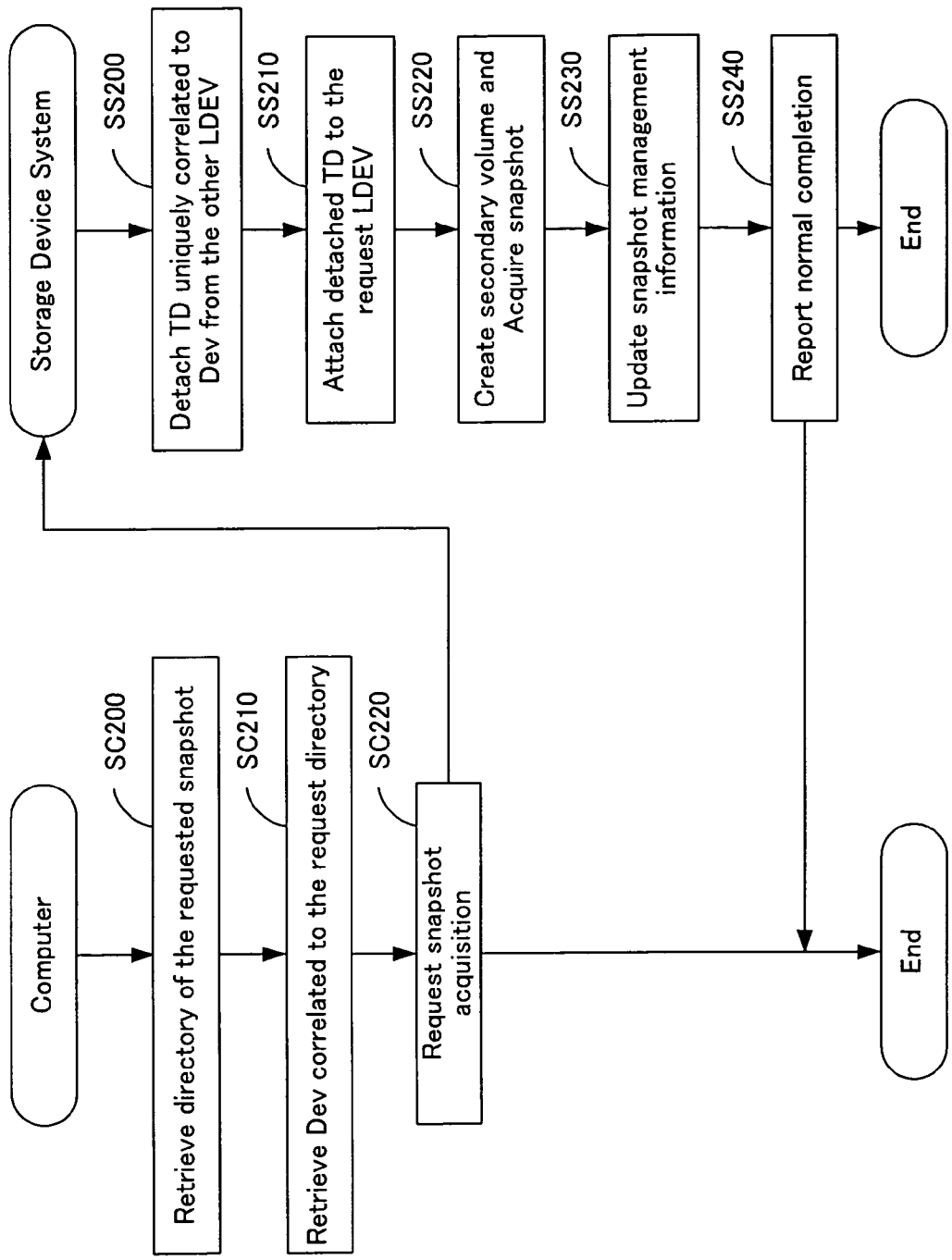
FIG. 15 is a flow chart showing the processing routine executed when acquiring the mirroring type snapshot file.

Next, while referencing FIG. 15, the process for acquiring the mirroring type snapshot file is described. FIG. 15 is a flow chart showing the processing routine that is executed when acquiring the mirroring type snapshot file. Note that using FIG. 14 for description, a simple description is given regarding the same process as the steps in the process of accessing the snapshot files.

The CPU 11 of the computer 10 for which a request is made to acquire snapshot files from the client computers 30 and 31 searches the request directory for storing the requested snapshot (step SC200) and retrieves the target device information Dev correlated to the request directory (step SC210). In specific terms, the CPU 11 uses the snapshot management information table CT1, searches directories indicating an acquisition state of not being acquired, and, for example, identifies the request directory in low to high sequence of the snapshot ID. The CPU 11 retrieves the target device Dev corresponding to the request directory from the usable device information table CT4, and identifies the corresponding logical device LDEV using the directory device information table CT2.

The CPU 11 transmits to the storage device system 20 information of the identified logical device as well as the snapshot file acquisition request (step SC220).

The CPU 21 of the storage device system 20 detaches the target device TD corresponding uniquely to the retrieved target device Dev from the other logical device LDEV (step SS200), and attaches the identified logical device LDEV to the target device TD for which the other logical device LDEV was detached (step SS210). The specific procedure was described with the description of SS100 and SS110 of FIG. 14.

The CPU 21 creates a secondary volume of the primary volume in the identified logical device LDEV, and acquires the snapshot file (step SS220). In specific terms, a copy of the primary volume is generated for the identified logical device LDEV.

The CPU 21 updates the snapshot management information table ST3 (step SS230), sends the normal completion report to the computer 20 (step SS240), and ends this processing routine. A specific description will be given regarding the procedure for updating the snapshot management information table ST3. The CPU 21, in the snapshot management information table ST3, updates the status of the logical device LDEV newly stored in the snapshot file to "Pair," and updates the pair attribute to "Secondary." The CPU 21, in the primary snapshot management information table ST31, registers the number of the logical device LDEV newly stored in the snapshot file to the logical device number of the new snapshot ID, and updates the acquisition status of the new snapshot ID to already acquired. The CPU 21, in the secondary snapshot management information table ST32, registers the logical device LDEV0 to the primary logical device of the logical device LDEV in which the snapshot file is newly stored.

When the computer 10 receives the normal completion report from the storage device system 20, this processing routine ends.

According to the storage system 100 of the first embodiment described above, at the computer 10, when the access request is input from the client computers 30 and 31, the target device Dev (TD) is mounted in the directory SS in which the requested snapshot file is stored, so it is possible to effectively use the target device Dev resources. Specifically, according to the storage system 100 of the first embodiment, it is possible to mount a plurality of directory SS on one target device Dev, so in contrast with conventional technology, it is not necessary to maintain the resources of the target device for each directory. As a result, for the overall storage system 100, it is possible to reduce the volume of resources of the target device Dev to be allocated to the snapshot files. Therefore, it is possible to reduce or eliminate the marked resource insufficiency of the target device Dev (TD) for the snapshot system for which many snapshot files are generated at an identified timing.

Furthermore, it is possible to make it look as if the snapshot processing was executed by the computer 10 to the client computers 30 and 31, and also to have the actual execution of the snapshot processing be executed on the storage device system 20 side, so it is possible to effectively use the other file processing functions provided by the computer 10.

Note that the computer 10 may also request acquisition of the snapshot file to the storage device system 20 without identifying in advance the directory for storing a new snapshot file. In this case, after acquisition of the snapshot file, the information of the logical device LDEV for which the snapshot file is created is received from the storage device system 20, and the various tables may be updated. Alternatively, at the computer 10 and the storage device system 20, when a new snapshot file is created, if a rule is set for storing the snapshot files in the low to high sequence of the open logical devices LDEV and directories, it is possible not to execute the step SC200 or the step SC210 executed by the computer 10.

Second Embodiment

Figure 16:
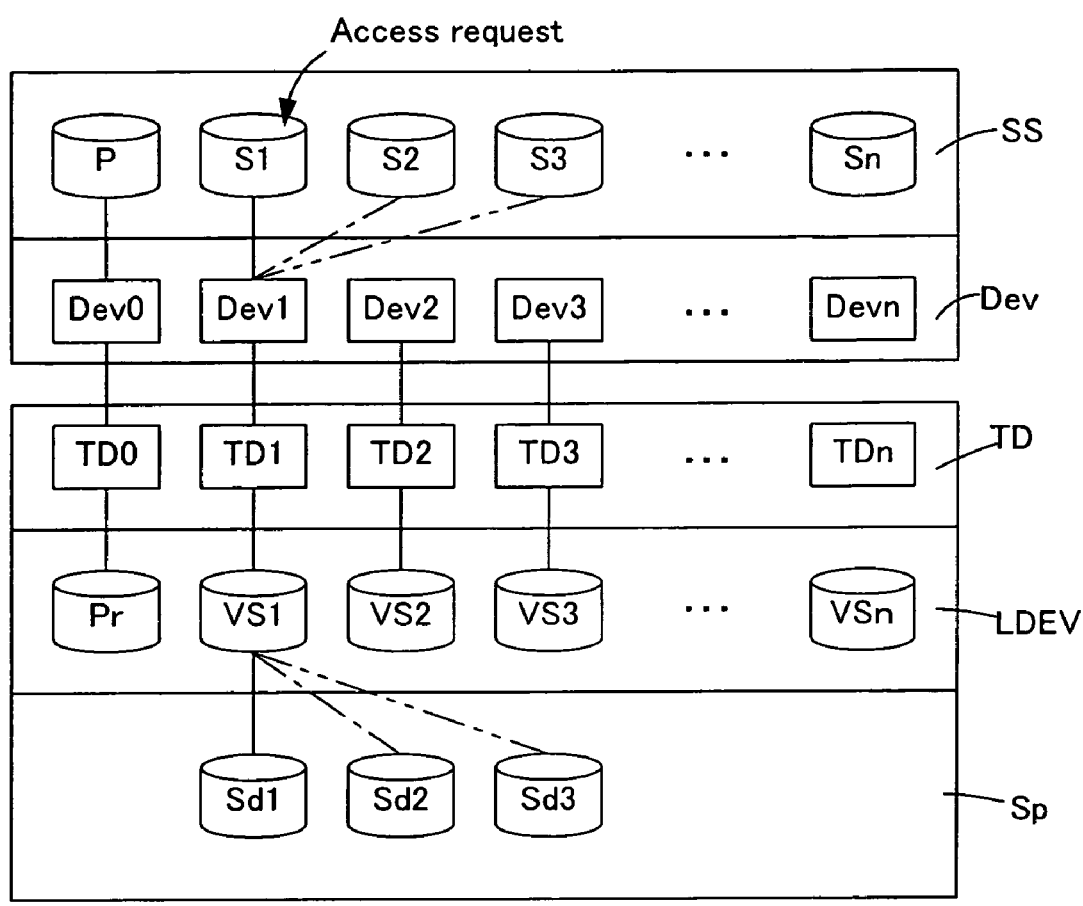
FIG. 16 is an explanatory drawing typically showing the correlation of the snapshot file information and the target device information recognized by the file system of the computer, and the logical device and the snapshot data group stored in the storage pool.
Figure 17:
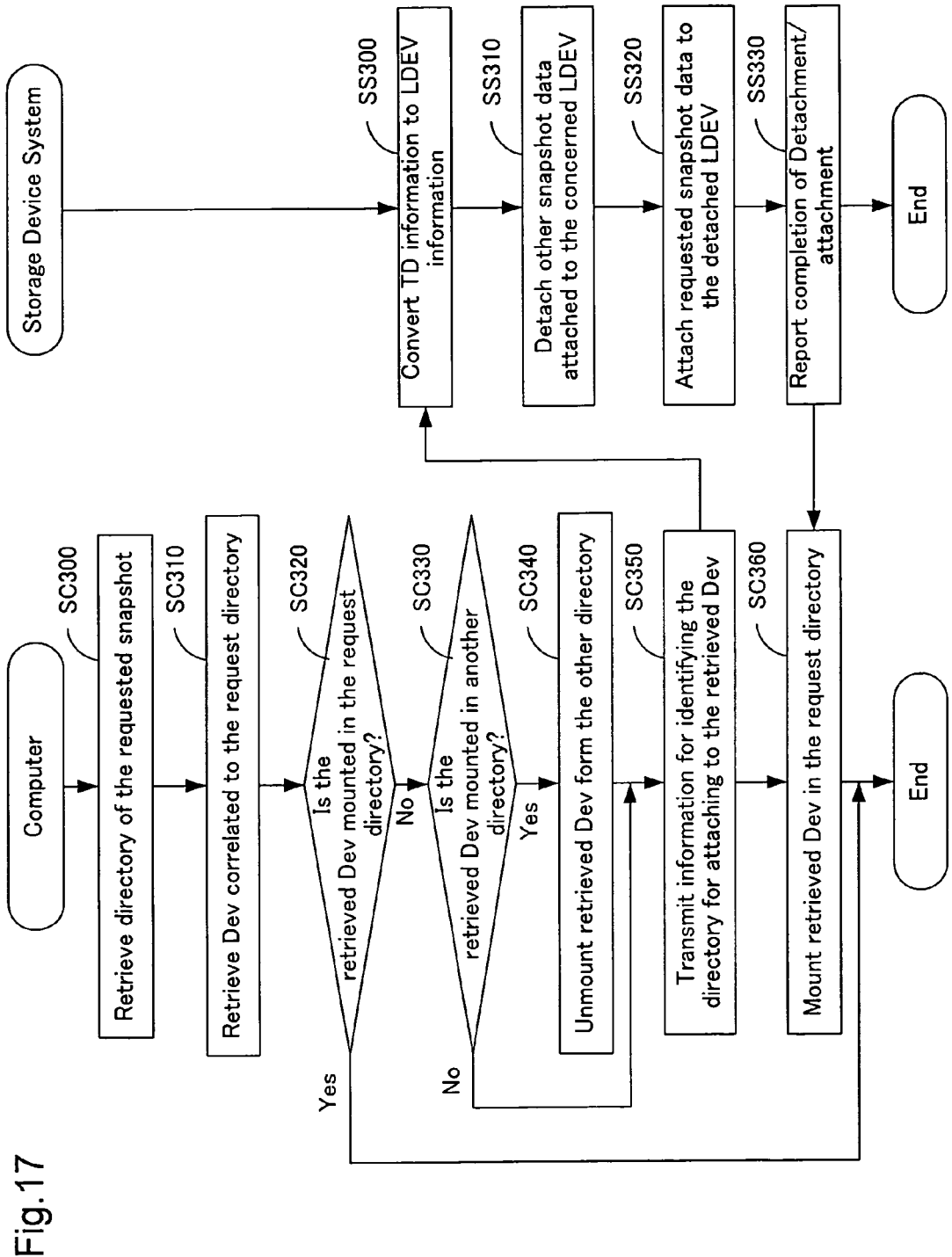
FIG. 17 is a flow chart showing the processing routine executed for the process of accessing the copy on write type snapshot files.
Figure 18:
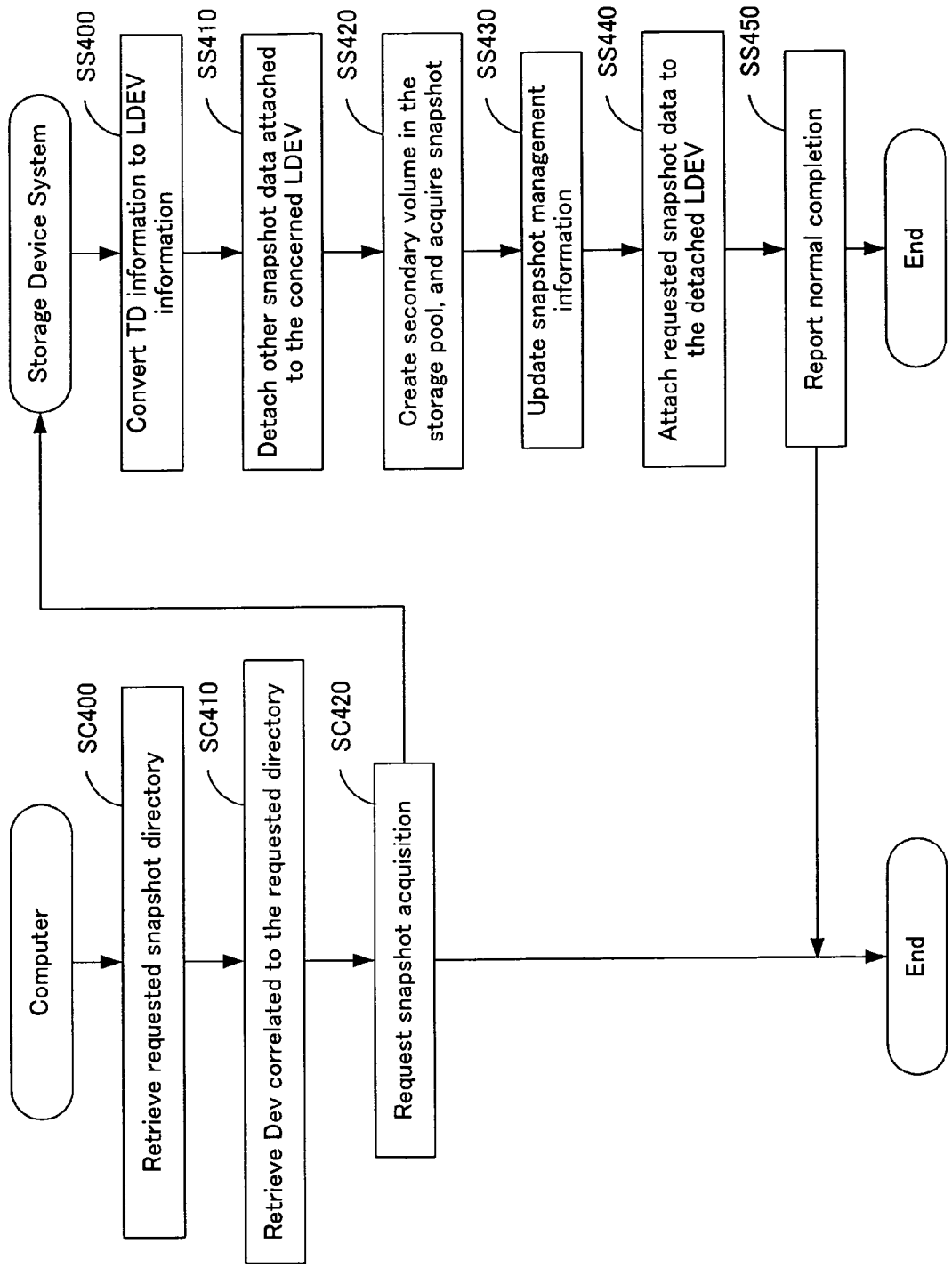
FIG. 18 is a flow chart showing the processing routine executed when acquiring the copy on write type snapshot file.

The copy on write type snapshot file process is described while referencing FIG. 16 to FIG. 18. FIG. 16 is an explanatory drawing typically showing the correlation of the snapshot file information SS and the target device information Dev recognized by the file system of the computer 10, the target device TD and the logical device LDEV for the storage device system 20, and the logical device LDEV and the snapshot data group stored in the storage pool. FIG. 17 is a flow chart showing the processing routine executed for the routine for accessing the copy on write type snapshot file. FIG. 18 is a flow chart showing the processing routine executed when acquiring the copy on write type snapshot file. Note that except for the point of the snapshot type being the copy on write type, this is the same as the mirroring type snapshot process described using FIG. 13 to FIG. 15, so for the same points, a detailed explanation is omitted, so the description will focus on the difference points.

With FIG. 16, the primary volume file for the computer 10 recognized by the client computer 30 (31) is represented as the file P, and the snapshot files are represented as the snapshot files S to Sn. The actual primary volume file for the storage device system 20 is represented as the file Pr, the update data (difference data) at an identified point in time is represented as Sd1 to Sd3, and the virtual volumes formed on the logical device LDEV during access to the snapshot file are represented as VS1 to VSn. The primary volume file P and the snapshot files S1 to Sn are identified by the directory SS, and the actual snapshot files Sd1 to Sdn are identified by the logical device LDEV. With the example in FIG. 16, the target device Dev0 is mounted in the primary volume file P. The snapshot files S1 to S3 which are the secondary volume files of the primary volume file are respectively able to be mounted exclusively in the target device Dev1. With the example in FIG. 16, there is a request for access to the snapshot file S1, so only the directory of the snapshot file S1 is mounted in the target device Dev1. Each of the target devices Dev recognized by the computer 10 is uniquely correlated respectively to the target devices TD for the storage device system 20. The computer 10 uses the difference data of the primary volume file P to generate the snapshot file at an identified point in time and to provide this to the client computers 30 and 31.

The storage device system 20 comprises a plurality of target devices TD, and a unique logical device LDEV (virtual volume VS) is attached to one target device TD. The update data (difference data) Sd1 to Sd3 at an identified point in time are stored in the storage pool Sp formed by the logical device LDEV. When a request to access a snapshot file of an identified generation is received, the storage device system 20, for example with the example in FIG. 16, attaches the difference data Sr1 to the logical device LDEV, and forms the virtual volume VS1 on the logical device LDEV1. The plurality of difference data Sr1 to Sr3 are exclusively attached to the logical device LDEV. Specifically, the difference data Sr is attached to the logical device LDEV for the storage device system 20 so as to correspond to the mounting of the target device Dev to the directory SS in the computer 10.

When a request to access the snapshot file Sn of an identified generation is made to the primary volume file P from the client computers 30 and 31, the flow chart shown in FIG. 17 is executed. The CPU 11 uses the snapshot management information table CT1 stored in the memory 12 to retrieve the directory SS in which the requested snapshot file Sn is stored (step SC300).

The CPU 11 retrieves the target device Dev used for accessing the retrieved directory using the usable device information table CT4 (step SC310). The CPU 11 determines whether or not the target device Dev retrieved using the directory device information table CT2 is mounted in the requested directory (step SC320). Note that when using the virtual volume, for the directory device information table CT2 shown in FIG. 4, the same logical device LDEV is allocated to the plurality of directories SS.

When the CPU 11 determines that the retrieved target device Dev is mounted in the request directory (step SC320: Yes), this processing routine ends. The client computers 30 and 31 are in a state for which it is possible to access the snapshot file S1.

When the CPU 11 determines that the retrieved target device Dev is not mounted in the request directory (step SC320: No), a determination is made of whether the retrieved target device Dev is mounted in another directory (step SC130). When the CPU 11 determines that the retrieved target device Dev is mounted in another directory (step SC330: Yes), the retrieved target device information Dev is unmounted from the other directory (step SC340).

When the CPU 11 determines that the retrieved target device Dev is not mounted in another directory (step SC330: No), step SC140 is skipped, and the process moves to step SC350.

At step SC350, the CPU 11 transmits to the storage device system 20 the access request containing the identification information for identifying the difference data to be attached to the retrieved target device Dev. The target device Dev information, primary volume information, and snapshot ID are used for the identification information.

When the CPU 21 of the storage device system 20 receives an access request from the computer 10, the CPU 21 converts the information of the target device TD uniquely corresponding to the retrieved target device Dev to the information of the corresponding logical device LDEV (step SS300). Specifically, the logical device LDEV uniquely corresponding to the target device TD is identified.

The CPU 21 detaches the other snapshot data Sd that is attached to the concerned logical device corresponding to the retrieved target device TD (step SS310). In specific terms, the CPU 21 nullifies the primary logical device information of the concerned logical device and the snapshot ID in the device attachment information table ST2.

The CPU 21 attaches the snapshot datan identified by the identification information received from the computer 10 to the logical device LDEV from which the other snapshot data Sd was detached (step SS320). In specific terms, in the device attachment information table ST2, the CPU 21 registers the received primary logical device information in the concerned logical device LDEV, and registers the received snapshot ID in the snapshot ID. For example, when the primary logical device is LDEV0 and the snapshot ID is 1, in the device attachment information table ST2, "LDEV0" is registered in the primary logical device of the concerned logical device LDEV, and "1" is registered in the snapshot ID.

The CPU 21 transmits the detachment/attachment completion report to the computer 10 (SS330), and this processing routine ends.

When the CPU 11 of the computer 10 receives the detachment/attachment completion report from the storage device system 20, the requested directory is mounted in the retrieved target device information Dev (step SC360), and this processing routine ends.

Next, the process for acquiring the mirroring type snapshot file is described while referencing FIG. 18.

The CPU 11 of the computer 10 for which a request was made to acquire the snapshot file from the client computers 30 and 31 searches the request directory for storing the requested snapshot (step SC400), and retrieves the target device information Dev correlated to the request directory (step SC410). The specific procedure was already described with the first embodiment.

The CPU 11 transmits to the storage device system 20 the information of the identified logical device as well as a request for acquisition of the snapshot file (step SC420).

When the CPU 21 of the storage device system 20 receives an access request from the computer 10, it converts the information of the target device TD uniquely corresponding to the retrieved target device Dev to the information corresponding logical device LDEV (step SS400). The CPU 21 detaches the other snapshot data Sd attached to the concerned logical device corresponding to the retrieved target device TD (step SS410).

The CPU 21 creates the secondary volume for storing the difference data Sr in the storage pool Sp, and acquires the snapshot file (step SS420). In specific terms, one or a plurality of data copies before updating corresponding to the part that is updated (changed) in the primary volume is created and stored in the secondary volume. Information for identifying the snapshot generation is correlated to each data, and by using this identification information, it is possible to identify the difference data Sr relating to the identified generation.

The CPU 21 updates the snapshot management information table ST3 (step SS430). The procedure for updating the snapshot management information table ST3 will be described specifically. Note that when using the virtual volume, the logical device number of the snapshot management information table ST3 and the snapshot detailed management information table ST31 and ST32 means the virtual volume number.

In the snapshot management information table ST3, the CPU 21 updates the status of the logical device LDEV for providing the virtual volume to "Pair" and updates the pair attribute to "Secondary" with attachment of the snapshot data. In the primary snapshot management information table ST31, the CPU 21 registers the number of the logical device LDEV for providing the virtual volume to the logical device number of the new snapshot ID, and updates the acquisition status of the new snapshot ID to already acquired. In the secondary snapshot management information table ST32, the CPU 21 registers the logical device LDEV0 to the primary logical device of the logical device LDEV for providing the virtual volume.

The CPU 21 attaches the snapshot datan identified by the identification information received from the computer 10 to the logical device LDEV form which the other snapshot data Sd was detached (step SS440), the CPU 21 sends a normal completion report to the computer 10 (step SS450), and this processing routine ends.

When the computer 10 receives the normal completion report from the storage device system 20, this processing routine ends.

As described above, according to the storage system 100 of the second embodiment, even when the virtual volume is used, with the computer 10, the target device Dev is mounted on the directory SS in which the snapshot file requested from the client computers 30 and 31 is stored, so it is possible to effectively use the resources of the target device Dev. Also, with the storage device system 20, it is possible to exclusively allocate a plurality of difference data Sr to the logical device LDEV for providing the virtual volume, so in contrast to the conventional technology, it is not necessary to maintain the resources of the target device for each difference data. As a result, it is possible to reduce the volume of resources of the target device Dev and TD for allocation to the snapshot files for the overall storage system 100.

With the storage system 100 of the first and second embodiments described above, examples of storing snapshot files were described, but it is also possible to try to achieve effective use of the storage system 100 by reducing the resource volume of the target device Dev and TD, with this the same as when storing general files. In this case, the computer 10 side snapshot management information table CT1 and the storage device system 20 side snapshot management information table ST3 and the snapshot detailed management information table ST31 and ST32 become unnecessary.

Figure 19:
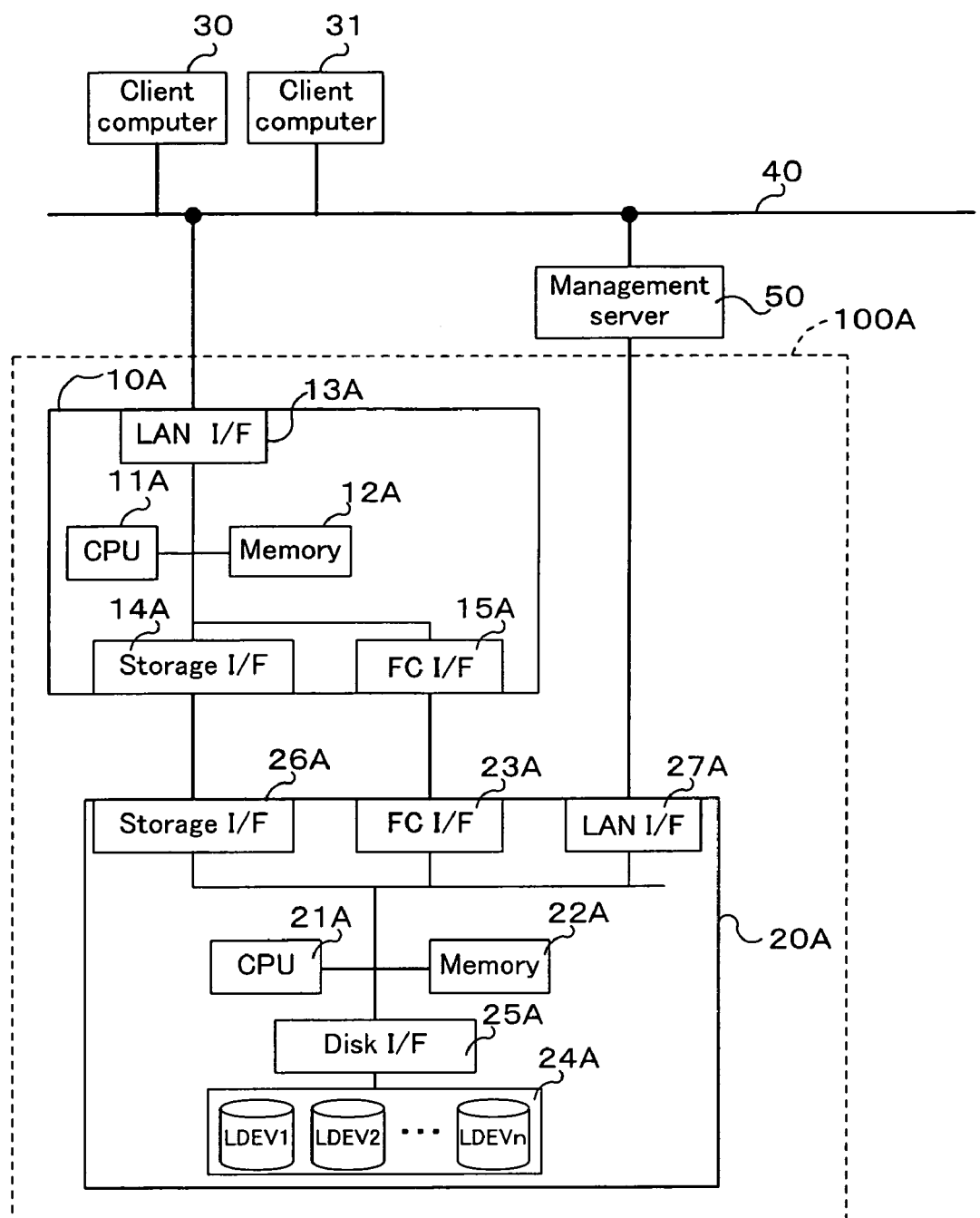
FIG. 19 is an explanatory drawing showing the schematic structure of the storage system 100A of another embodiment.

Other Embodiments (1) With the first and second embodiments noted above, described was a case for which the snapshot file is stored using the storage system 100 for which the computer 10 and the storage device system 20 are stored in the same case, but as shown in FIG. 19, it is possible to apply this in the same way for storage systems for which the computer 10 and the storage device system 20 are constructed separately. FIG. 19 is an explanatory drawing showing the schematic structure of the storage system 100A related to other embodiments.

The storage system 100A of FIG. 19 comprises a computer 10A and a storage device system 20A accessed by the computer 10A. The client computers 30 and 31 and the management server 50 are connected via the network 40 or directly connected to the storage system 100A. Typically there is no compatibility between the commands used for the file system of the computer 10A and the commands used for the storage device system 20A, so it is necessary to define a special command and to send instructions from the computer 10A to the storage device system 20A.

The computer 10A of FIG. 19 is connected to the client computers 30 and 31 via the network 40. The computer 10 internally comprises a central processing unit (CPU) 11A, a memory 12A, a LAN interface 13A, a storage interface 14A, and an FC interface 15A. The CPU 11A, the memory 12A, and each interface 13, 14, and 15 are mutually connected via a bus.

The storage device system 20 comprises a central processing unit (CPU) 21A, a memory 22A, an FC interface 23A, a plurality of disk devices 24A, a disk interface 25A, a storage interface 26A, and a LAN interface 27A.

The FC interfaces 15A and 23A are connected by an optic fiber cable or copper wire, for example, and commands and data are sent and received using a fiber channel protocol between the computer 10 and the storage device system 20. The management server 50 is connected to the storage device system 20A via the LAN interface 27A, and commands and data are sent and received.

The disk device 24A is a disk array device formed by RAID construction by a plurality of magnetic hard disk drives, and one or a plurality of storage areas, specifically, logical devices (LDEV), are provided by a plurality of hard disk drives, or one or a plurality of logical devices is provided by one hard disk drive.

The CPU 21A is connected to the disk device 24A via the disk interface 25A. The disk interface 25A converts the logic address transmitted from the CPU 21A to the logic block address, and access is realized to each logical device by the CPU 21A.

The storage interfaces 13A and 26A are interfaces for exchanging special commands for indicating the detachment/attachment of the logical device LDEV to the target device TD between the computer 10A and the storage device system 20A. The special commands are preset standard read/write commands to the logical device LDEV (command device), and, for example, commands for indicating the detachment/attachment of the logical device LDEV to the target device TD and commands for indicating the acquisition of a snapshot are added. The computer 10A transmits special commands to the storage interface 26A of the storage device system 20 via the storage interface 13A. When the received command is a read/write command to the command device, the storage interface 26A interprets the detachment/attachment command of the logical device LDEV to the added target device TD, executes the detachment/attachment process of the logical device LDEV to the target device TD, and gives instructions to execute the snapshot acquisition process.

(2) A case of using the storage system 100 and 100A for a typical file system will be described. Note that with the description below, the description is given using the example of the constitution shown in FIG. 1 and using the code numbers shown in FIG. 1, but it goes without saying that the same application may be obtained also for the constitution shown in FIG. 19. When applying to a typical file system, one target device Dev is shared by a plurality of client computers, so mounting of the target device to a suitable directory is requested according to the client computer. Possible methods of solving this request include the following examples.

Create a directory for each client computer under the same target device.

Use the IP address information of the client computer.

In the former case, using the procedure described for the first embodiment or the second embodiment, it is possible to mount the target device on the suitable directory according to the client computer. Specifically, by having each snapshot file S1 to Sn of the first embodiment be a directory (file) exclusive to each client computer, the computer mounts the target device to a suitable directory, and it is possible for the storage device system 20 to attach the logical device LDEV to a suitable target device TD. With the storage system 200 of the first embodiment, each time an access request occurs for a snapshot file, the mounting of the target device to the directory and the attachment of the logical device LDEV to the target device TD are executed, so the request for access to the snapshot file may be processed as a request for access to the file from the client computer. Note that the computer 10 and the storage device system 20 have the same tables except for the table relating to the snapshots.

In the latter case, for example by comprising the table shown in FIG. 20, it is possible to mount the target device on a suitable directory for each client computer. FIG. 20 is an explanatory drawing showing an example of the client identification table that the computer 10 comprises.

As shown in FIG. 20, the IP addresses for identifying each client computer and the target devices that may be used by each client computer are correlated. When the computer 10 receives the access request from the client computer, it acquires the IP address of the client computer, and determines the target device to be accessed. When the determined target device is used by another client computer, the computer 10 gives notice to the client computer that access in the identified time is impossible, and transmits an interrupt access request to the storage device system 20 after an identified time has elapsed.

Alternatively, the computer 10 transmits the interrupt access request to the storage device system 20 immediately, and provides access to the desired file to the client computer.

Even in the case of the description noted above, it is possible to try to achieve effective use of the target device resources for the storage system.

(3) With each of the embodiments described above, cases for which the storage device system comprised one computer were described, but it is also possible to comprise a plurality of computers. In this case, it is necessary to prevent overlapping use of the target devices between the computers. For example, use status of the target device is indicated to the computers, and the computers transmit access requests to the storage device system based on the concerned use status information. Alternatively, by fixing the logical device to each of the computers, specifically, by determining the target device that may be used for each of the computers, it is possible to prevent overlapping use of the target devices.

For the first and second embodiments noted above, it is also possible to combine the flow chart of the process for accessing the snapshot files and the flow chart of the process for acquiring the snapshots. In this case, it is possible to access the snapshot files immediately after acquisition of the snapshots. Specifically, the target device Dev is already mounted in the directory in which the newly acquired snapshot file is stored, so it is possible to immediately access (read/write) the snapshot files.

While this invention has been described in terms of several preferred embodiments, it will be appreciated that those skilled in the art upon reading the preceding identifications and studying the drawings will realize various alterations, additions, permutations and equivalents thereof It is therefore intended that the present invention includes all such alterations, additions, permutations, and equivalents as fall within the true spirit and scope of the invention.

What is claimed is:

1. A storage system having a first computer, a second computer connected to the first computer via a network, and a storage device system, wherein the storage device system is accessed by the second computer and has a plurality of storage areas of the storage device system, in the storage system, the second computer comprising:

a plurality of storage areas of the second computer, which are recognized by the first computer; and a plurality of target devices of the second computer, which are recognized by the first computer;

wherein the plurality of target devices of the second computer at least include target device A of the second computer, which is exclusively mounted on any of the plurality of storage areas of the second computer including storage area A of the second computer, the second computer further comprising:

a receiving unit that receives a first access request to access the storage area A of the second computer among the plurality of storage areas of the second computer;

a target device identification module that identifies the target device A of the second computer from among the plurality of target devices of the second computer, in response to the first access request;

a mounting module that exclusively mounts the identified target device A of the second computer on the storage area A of the second computer; and a transmission unit that transmits to the storage device system a second access request to identify a storage area A of the storage device system among the plurality of storage areas of the storage device system, which corresponds to the storage area A of the second computer;

and the storage device system comprising:

one or a plurality of physical storage devices forming the plurality of storage areas of the storage device system;

a plurality of target devices of the storage device system for which one storage area of the storage device system among the plurality of storage areas of the storage device system, is allocated;

a receiving unit that receives the second access request; and an allocation change module that allocates the area A of the storage device system to a target device of the storage device system, which corresponds to the target device A of the second computer according to the second access request.

2. A storage system recited in claim 1, wherein the second computer further comprises computer side correspondence information for correlating the storage areas of the second computer and the target devices of the second computer, the target device identification module uses the computer side correspondence information to specify the target device A to be mounted in the requested storage area A of the second computer, the storage device system further comprises storage device system side correspondence information for correlating the storage areas and the target devices, and the allocation change module allocates the storage area for which access is requested to the identified target device using the storage device system side correspondence information.

3. A storage system recited in claim 2, wherein the access request includes storage area identification information for identifying the storage area corresponding to the storage area of computer for which the access is requested, and the allocation change module allocates the storage area for which the access is requested to the identified target device using the storage device system side correspondence information and the storage area identification information.

4. A storage system recited in claim 1, wherein the storage areas corresponding to the storage areas of the second computer for which access is requested are virtual storage areas formed virtually by primary information and difference information in relation to the primary information, the second computer further comprises computer side correspondence information for correlating the storage areas of computer and the target devices, and the target device identification information module identifies the target device to be mounted in the requested storage area of computer using the computer side correspondence information, the storage device system further comprises storage device system side correspondence information for correlating the virtual storage areas and the target devices, and the allocation change module allocates the storage area A of the storage device system to the target device of the storage device system, which corresponds to the target device A of the second computer using the storage device system side correspondence information.

5. A storage system recited in claim 4, wherein the first access request includes target device identification information for identifying the identified target device A, primary information identification reformation for identifying the primary information, and difference information identification information for identifying the difference information required for forming the virtual storage area for which access is requested, and the allocation change module allocates the storage area A of the storage device system for which the access is requested to the identified target device A of the storage device system using the storage device system side correspondence information, the primary information identification information, and the difference information identification information.

6. A storage system recited in claim 1, wherein the second computer further comprises:

a mount decision module that determines whether the target device A to be mounted to the storage area A of the second computer is mounted on the another storage area of the second computer, and an unmounting module that unmounts the target device A when the target device A to be mounted to the storage area A of the second computer is mounted on another storage area of the second computer.

7. A storage system recited in claim 6, wherein the allocation change module in the storage device system further comprises:

an allocation decision module that determines whether the identified target device is allocated to the another storage area;

an allocation release module that cancels the allocation of the identified target device to the another storage area when the identified target device A is allocated to the another storage area, and an allocation action module that allocates the identified target device to the storage area A, and which corresponds to the target device A of the second computer.

8. A storage system recited in claim 1, wherein the storage device system further comprises a point in time copy module that saves primary information stored in one storage area among the plurality of storage areas to another storage area at any time, and the second computer further comprises a point in time copy request module that requests obtaining of the primary information at any time to the storage device system.

9. A storage system recited in claim 8, wherein the point in time copy module implements the saving of the primary information at any time by copying the primary information at any time stored in the one storage area to another storage area.

10. A storage system recited in claim 8, wherein the point in time copy module implements the saving of the primary information at any time by storing the change history for the primary information stored in the one storage area to another storage area.

11. A storage system recited in claim 1, wherein the receiving unit of the second computer also receives a request to access the storage areas of the second computer other than the storage area A of the second computer.

12. A storage system recited in claim 1, wherein the storage areas of the second computer are directories.

13. A storage system comprising a first computer, a second computer connected to the first computer via a network, and a storage device system having a physical storage areas for storing primary information and logical storage areas for storing information for providing the primary information at various times, in the storage system, the second computer comprising:

a plurality of storage areas of the second computer, which are recognized by the first computer; and a plurality of target devices of the second computer, which are recognized by the first computer;

wherein the plurality of target devices of the second computer at least include target device A of the second computer, which is exclusively mounted on any of the plurality of storage areas of the second computer including storage area A of the second computer, the second computer further comprising:

a receiving unit that receives a first access request to the primary information at a particular time;

a target device identification module that identifies the target device A of the second computer from among the plurality of target devices of the second computer, in response to the first access request; and a transmission unit that transmits to the storage device system a second access request to identify a logical storage area A of the storage device system that stores information for providing the primary information at the particular time and which corresponds to the storage area A of the second computer; and the storage device system comprising:

one or a plurality of physical storage devices for forming the plurality of logical storage areas of the storage device system;

a plurality of target devices for each of which one logical storage area of the plurality of the logical storage areas is allocated;

a receiving unit that receives the second access request; and an allocation change module that allocates the logical storage area A of the storage device system to a target device of the storage device system, which corresponds to the target device A of the second computer, according to the second access request.

14. A storage system recited in claim 13, wherein the information for providing the primary information at that any time includes a copy of the primary information at the particular time, and the allocation change module provides the primary information at the particular time to the second computer by allocating the logical storage area A of the storage device system storing the information that is the copied primary information at the particular time in relation to the target device which corresponds to the target device A of the second computer.

15. A storage system recited in claim 13, wherein the information for providing the primary information at the various times includes change history information for the primary information immediately prior to the various times, the allocation change module further comprises a virtual storage area forming module that virtually forms storage areas using the change history and the primary information at the various times, and the allocation change module provides the primary information at the particular time to the second computer by allocating one of the formed virtual storage areas to the target device which corresponds to the target device A of the second computer.

16. A storage system recited in claim 15, wherein the change history information include a pre-change information that is the information before a change of a change location of the primary information, and the time identification information for identifying the various times generated by the pre- change information, and the virtual storage area forming module forms the virtual storage areas using the pre-change information correlated to the time identification information at the particular time.

17. A storage system comprising a first computer, a second computer connected to the first computer via a network, and a storage device system that is accessed by the second computer and that has a plurality of storage areas, in the storage system, the second computer comprising:

a plurality of storage areas of the second computer, which are recognized by the first computer; and a plurality of target devices of the second computer, which are recognized by the first computer, wherein the plurality of target devices of the second computer at least include target device A of the second computer, which is exclusively mounted on any of the plurality of storage areas of the second computer including storage area A of the second computer, the second computer further comprising:

a receiving unit that receives a first access request to access the storage area A of the second computer from among the plurality of storage areas of the second;

a target device identification module that identifies the target device A of the second computer from among the plurality of target devices of the second computer, in response to the first access request;

a mount decision module that determines whether the target device A to be mounted to the storage area A of the second computer is mounted on the another area of the second computer;

an unmounting module that unmounts the target device A when the target device A to be mounted to the storage area A of the second computer is mounted on the another storage area of the second computer;

a mounting module that exclusively mounts the target device A on the requested storage area A of the second computer after receiving notification that allocation is completed from the storage device system; and a transmission unit that transmits to the storage device system a second access request to identify a storage area A of the storage device system among the plurality of storage areas of the storage device system, which corresponds to the storage area A of the second computer;

and the storage device system comprising:

one or a plurality of physical storage devices for forming the plurality of storage areas of the storage device system;

a plurality of target devices of the storage device system for each of which one storage area of the storage device system among the plurality of storage areas of the storage device system is allocated;

a receiving unit that receives the second access request;

an allocation decision module that determines whether an identified target device is allocated to another storage area according to the second access request;

an allocation release module that cancels allocation of the identified target device to the another storage area when the identified target device is allocated to the another storage area;

an allocation action module that allocates the identified target device to the another storage area when the identified target device is allocated to the another storage area;

an allocation action module that allocates the identified target device to the storage area A of the storage device system, and which corresponds to the target device A of the second computer; and an allocation completion notification module that notifies the second computer of an allocation completion notification when the allocation is completed.

18. A computer for a accessing a storage device system comprising:

a plurality of storage areas of the computer, which are recognized by another computer; and a plurality of target devices of the computer, which are recognized by the another computer;

wherein the plurality of target devices of the computer at least include target device A of the computer, which is exclusively mounted on any of the plurality of storage areas of the computer including storage area A of the computer, the computer further comprising:

a receiving unit that receives a first access request to access storage area A of the computer from among the plurality of storage areas of the computer;

a target device identification module that identifies the target device A of the computer from among the plurality of target devices of the computer;

a mount decision module that determines whether the target device A of the computer from among the plurality of target devices of the computer;

a mount decision module that determines whether the target device A to be mounted to the storage area A of computer is mounted on another storage area of the computer;

an unmounting module that unmounts the target device A when the target device A to be mounted to the storage area A of the computer is mounted on the another storage area of computer;

a mounting module that exclusively mounts the target device A to the storage area A of the computer after receiving an allocation completion notification from the storage device system; and a transmission unit that transmits to the storage device a second access request to identify a storage area A of the storage device system among the plurality of storage areas of the storage device system, which corresponds to the storage area A of the computer.

* * * * *